US011135611B2

(12) United States Patent
Lim (10) Patent No.: US 11,135,611 B2
(45) Date of Patent: Oct. 5, 2021

(54) SYSTEM FOR SPRAYING A WALL SURFACE OF A BUILDING AND METHOD THEREFOR

(71) Applicant: Elid Technology International Pte Ltd, Singapore (SG)

(72) Inventor: Hui Eng Lim, Singapore (SG)

(73) Assignee: Elid Technology International Pte Ltd, Singapore (SG)

( * ) Notice: Subject to any disclaimer, the term of this patent is extended or adjusted under 35 U.S.C. 154(b) by 135 days.

(21) Appl. No.: 16/177,326

(22) Filed: Oct. 31, 2018

(65) Prior Publication Data
US 2019/0160482 A1   May 30, 2019

(30) Foreign Application Priority Data

Nov. 24, 2017   (SG) ............................ 10201709756X (51) Int. Cl.
| | | |
|---|---|---|
| *B05B 13/04* | (2006.01) | |
| *B25J 11/00* | (2006.01) | |
| *B25J 5/02* | (2006.01) | |
| *B05B 15/70* | (2018.01) | |

(Continued)

(52) U.S. Cl.
CPC ........ *B05B 13/0431* (2013.01); *B05B 12/004* (2013.01); *B05B 13/005* (2013.01);
(Continued)

(58) Field of Classification Search
USPC ................................ 118/323, 321, 679–681
See application file for complete search history.

(56) References Cited

U.S. PATENT DOCUMENTS

| | | | |
|---|---|---|---|
| 3,347,339 A | | 10/1967 | Coole |
| 3,783,819 A | * | 1/1974 | Hammelmann .......... B63C 5/02 118/679 |

(Continued)

FOREIGN PATENT DOCUMENTS

| | | |
|---|---|---|
| CN | 204769318 U | 11/2015 |
| CN | 106592953 A | 4/2017 |
| JP | 2016-211222 A | 12/2016 |

OTHER PUBLICATIONS

Search Report of Singapore Patent Application No. 10201709756X dated Dec. 4, 2018 (3 pages).

(Continued)

*Primary Examiner* — Yewebdar T Tadesse
(74) *Attorney, Agent, or Firm* — Pyprus Pte Ltd; George D. Liu (57) ABSTRACT

The present invention provides an automated system for spraying an wall of a building. The automated system comprises a carrier; a robotic mechanism mounted on the carrier, the robotic mechanism further having an end effector adapted to support a spray nozzle thereon; a visual monitoring system configured to scan structural characteristics and profiles of the wall; a computing device disposed in communication with the visual monitoring system and the robotic mechanism, wherein the computing device is configured to receive the scanned structural characteristics and profile of the wall from the visual monitoring system; and a controller communicably coupled to the computing device, the controller configured to independently control operation of respective ones of the robotic mechanism, and the spray nozzle according to the scanned structural characteristics and profiles of the wall.

4 Claims, 7 Drawing Sheets

(51) Int. Cl.
*B05B 13/00* (2006.01)
*B05B 12/00* (2018.01)
*B25J 19/02* (2006.01)
*B62D 57/024* (2006.01)
*B05B 15/68* (2018.01)

(52) U.S. Cl.
CPC ............... *B05B 15/70* (2018.02); *B25J 5/02* (2013.01); *B25J 11/0075* (2013.01); *B25J 11/0085* (2013.01); *B25J 19/021* (2013.01); *B62D 57/024* (2013.01); *B05B 12/00* (2013.01); *B05B 15/68* (2018.02)

(56) References Cited

U.S. PATENT DOCUMENTS

| | | | |
|---|---|---|---|
| 4,424,884 A * | 1/1984 | Smith, Jr. | ............... A62B 1/02 182/12 |
| 10,213,801 B2 * | 2/2019 | Lim | ............. B25J 15/0019 |
| 10,214,926 B2 * | 2/2019 | Lim | ............... F16B 47/00 |
| 2017/0080438 A1 | 3/2017 | Storr | |
| 2017/0282202 A1 | 10/2017 | Lim | |
| 2017/0284113 A1 | 10/2017 | Lim | |

OTHER PUBLICATIONS

Written Opinion of Singapore Patent Application No. 10201709756X dated Dec. 5, 2018 (6 pages).
Examination Report of Singapore Patent Application No. 10201709756X dated Mar. 12, 2020 (3 pages).

* cited by examiner

SYSTEM FOR SPRAYING A WALL SURFACE OF A BUILDING AND METHOD THEREFOR

TECHNICAL FIELD

The present disclosure relates to a robotically-operated painting and cleaning system. More particularly, the present disclosure relates to a robotically-operated spraying system that can be used for spraying wall surface of a building for purpose of painting and/or cleaning.

BACKGROUND

It is well known in the art to use a moveable carrier suspended by cables from atop a building for painting and cleaning an wall of the building. In some cases, these moveable carriers may be sized large enough to accommodate painters and/or cleaner therein who would then set up to manually paint the wall of the building. With use of such large-sized carriers, structures required to support the carriers would need to be sturdy enough to withstand the weight of the carrier in operation besides minimizing the tendency of the carrier to sway under the undesired effect of wind forces. An example of a sturdy mechanism for suspending such large sized carriers is disclosed in U.S. Pat. No. 3,347,339.

Nevertheless, in recent times, a size of these moveable carriers has been reduced with implementation of automated robotic mechanisms that are capable of performing the painting and cleaning operations. However, with incorporation of such automated robotic mechanisms, it would only be prudent to additionally render these moveable carriers with enhanced structural and performance capabilities that would facilitate movement of the carriers and the automated robotic mechanisms disposed within to traverse the span of the wall surfaces in an optimal or efficient manner and carry out the operations synergistically.

Hence, there is a need for a simple and compact robotically-operated painting system that is designed to efficiently perform spray painting or cleaing over walls surface of a building in a fairly quick and easy manner.

SUMMARY

In an aspect of the present invention, there is provided an automated system for spraying an wall of a building, the system comprises a carrier; a robotic mechanism mounted on the carrier, the robotic mechanism further having an end effector adapted to support a spray nozzle thereon, a visual monitoring system configured to scan structural characteristics and profiles of the wall, a computing device disposed in communication with the visual monitoring system and the robotic mechanism, wherein the computing device is configured to receive the scanned structural characteristics and profile of the wall from the visual monitoring system; and a controller communicably coupled to the computing device, the controller configured to independently control operation of respective ones of the robotic mechanism, and the spray nozzle according to the scanned structural characteristics and profiles of the wall.

In one embodiment, the carrier is a aerial work platform.

In one aspect, the carrier comprises a boom lift.

In one embodiment, the system may further comprise a linear track located on the carrier and disposed horizontally with respect to the height of the building, wherein the robotic mechanism is slidably mounted on the linear track.

In another embodiment, the system may comprises a two ways tracks disposed on the carrier, wherein the robotic mechanism is slidably mounted thereon, the two ways tracks comprises at least two axes movements allowing the robotic mechanism to slide over the two axes movements.

In another aspect, the carrier comprises a scissor lift.

In one embodiment, the system may comprise a linear track located on the carrier and disposed horizontally with respect to the height of the building, wherein the robotic mechanism is slidably mounted on the linear track.

In yet another embodiment, the system may comprising a two ways tracks disposed on the carrier, wherein the robotic mechanism is slidably mounted thereon, the two ways tracks comprises at least two axes movements allowing the robotic mechanism to slide over the two axes movements.

In yet a further aspect, the automated system comprises a gondola carrier mounted on a building, wherein the gondola carrier comprises at least suction cups located at a free end of each linear actuator and disposed in an opposing relation to the wall of the building, wherein the suction cups are configured to selectively adhere with the wall of the building for positioning the gondola carrier.

In one embodiment, the system may further comprises a stabilizer platform disposed below the carrier, and moveably connecting to the carrier through a connecting bar, and a drive system adapted to operatively position the stabilizer platform relative to the carrier along the connecting bar; and a secondary suction mechanism installed on the stabilizer platform, wherein the secondary suction mechanism is separately controlled to adheres to the wall of the building. Operationally when the stabilizer platform is moving in relation to the carrier, at least either one of the suction cups or the secondary suction mechanism is adhered to the wall of the building.

In another embodiment, the system further comprises a linear track located on the carrier and disposed horizontally with respect to the height of the building, wherein the robotic mechanism is slidably mounted on the linear track.

In yet another embodiment, the system may comprise a two ways tracks disposed on the carrier, wherein the robotic mechanism is slidably mounted thereon, the two ways tracks comprises at least two axes movements allowing the robotic mechanism to slide over the two axes movements.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
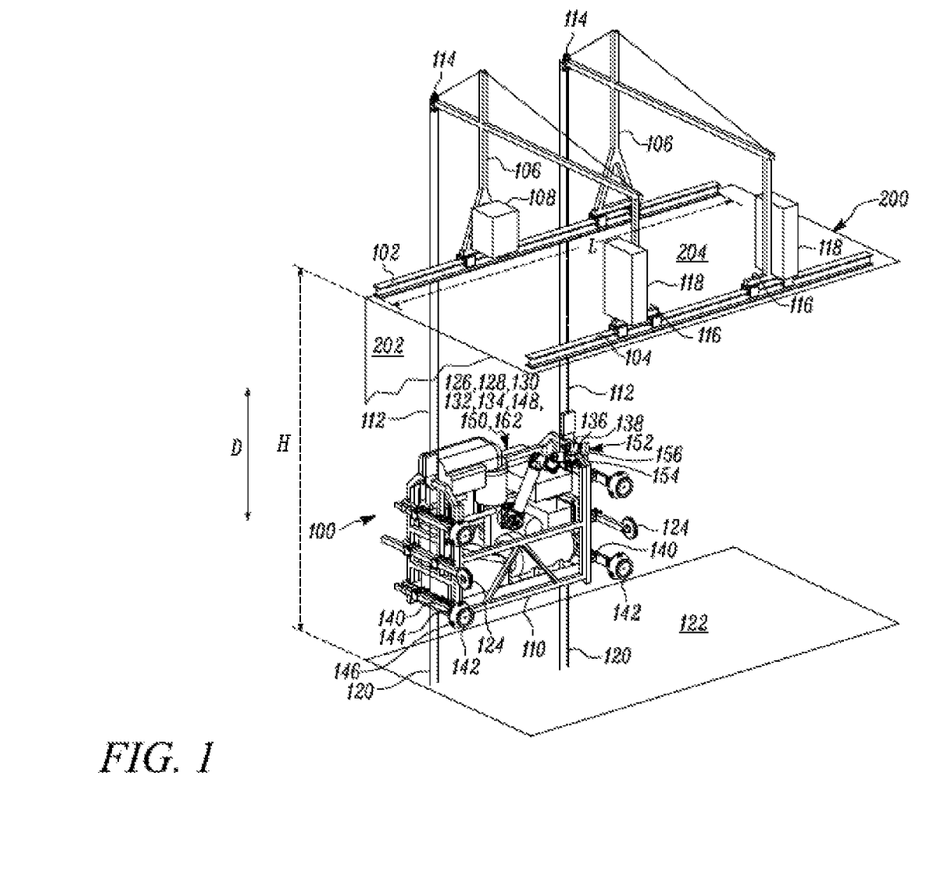
FIG. 1 is a perspective view of a system for painting an wall of a building, in accordance with embodiments of the present invention.

FIG. 1 illustrates a system 100 for spraying an wall 202 of a building 200 in accordance with an embodiment of the present invention. The system 100 includes a pair of rails 102, 104 disposed on an upper portion 204 of the building 200. A first one of the rails 102 is configured to slidably support movement of at least one frame member 106 thereon. In an example, two frame members 106 are shown in the illustrated embodiment of FIG. 1. However, it may be noted that fewer or more frame members 106 may be implemented depending on specific requirements of an application including, but not limited to, a structural integrity of the frame member that is required to perform functions consistent with the present disclosure.

For avoidance of doubt, the system 100 adapts a spraying mean, which can be used for spraying paints and/or clean water for cleaning wall surface.

The frame member 106 has a primary motor 108 mounted thereto for facilitating lateral movement of the frame member 106 along a length L of the first one of the rails 102. The system 100 also includes a carrier 110 suspended from the frame member 106 by cables 112 that are supported on pulleys 114 associated with the frame member 106. In an embodiment as shown in FIG. 1, each frame member 106 includes a free end 116 that is engaged with a second one of the rails 104. The free end 116 of each frame member 106 is associated with a predetermined weight 118 to counterbalance a weight of the carrier 110. Also, the system 100 further includes a tow line 120 connecting the carrier 110 to a ground surface 122. The tow line 120 is configured to stabilize a position of the carrier 110 in relation to the wall 202.

In one embodiment, the carrier 110 can be a gondola carrier.

In a further embodiment as shown in FIG. 1, the system 100 additionally includes at least one wheel 124 disposed on the carrier 110 and located in an opposing relation to the wall 202. The wheel 124 is configured to assist when the carrier is maneuvering by the wall 202.

The carrier 110 is adapted to accommodate a secondary motor 126, a visual monitoring system 128, a robotic mechanism 130, a computing device 132, and a controller 134 therein. The secondary motor 126 is engaged with the cables 112 to facilitate movement of the carrier 110 in a direction D parallel to a height H of the wall 202.

The visual monitoring system 128 is configured to scan structural characteristics and profiles of the wall 202 through digital imaging techniques. In one embodiment, the visual monitoring system 128 may include a 3-dimensional camera. In another embodiment, the visual monitoring system 128 may include a 3-dimensional laser scanner.

The robotic mechanism 130 has an end effector 136 that is adapted to support a spray nozzle 138 thereon. In an embodiment of this disclosure, the robotic mechanism 130 has six degrees of freedom in movement for facilitating the spray nozzle 138 in spraying the wall 202 of the building 200.

Figure 2:
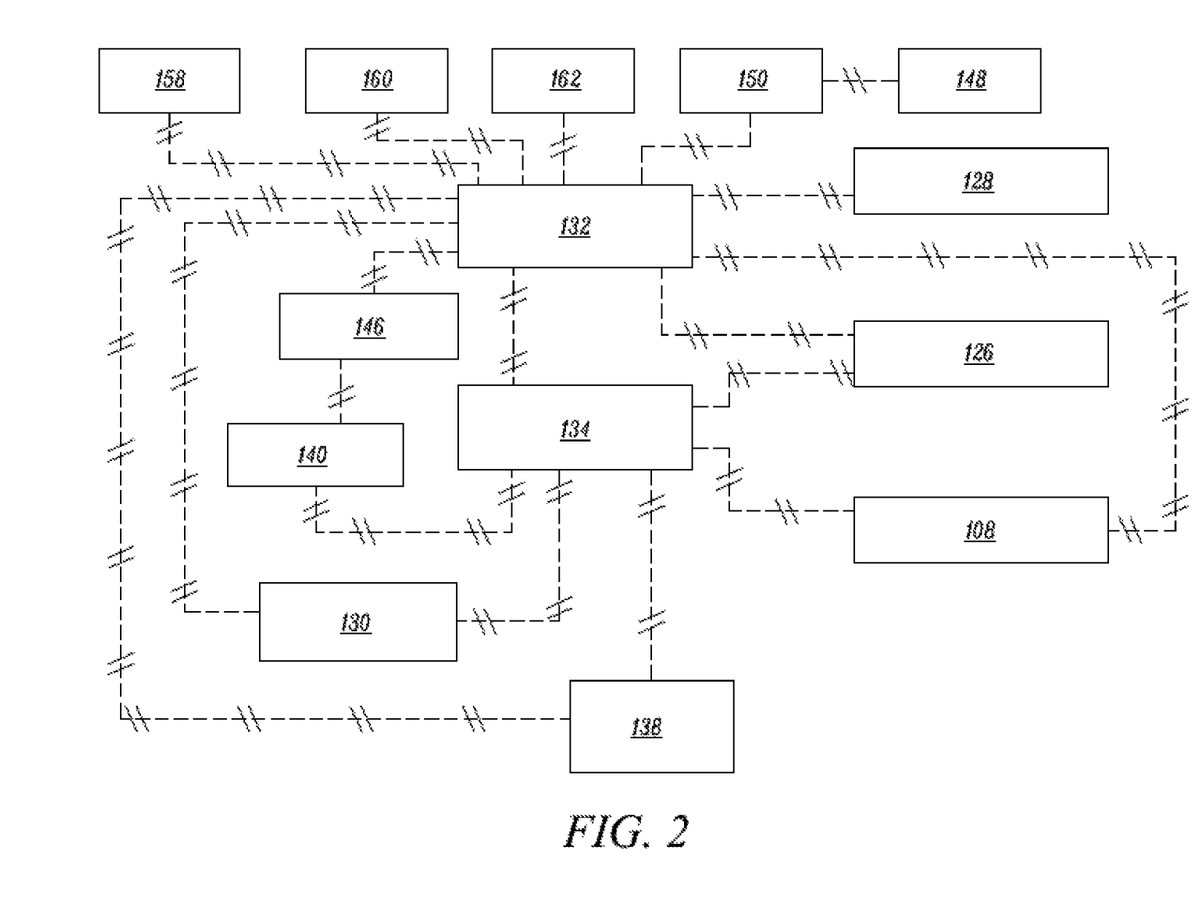
FIG. 2 is a schematic representation of components of the system from FIG. 1, in accordance with an embodiment of the present invention.

FIG. 2 illustrates a schematic representation of components of the system 100 from FIG. 1. As shown in FIG. 2, the computing device 132 is disposed in communication with the visual monitoring system 128, the primary motor 108, the secondary motor 126, the robotic mechanism 130, and the spray nozzle 138. The computing device 132 is configured to receive the scanned structural characteristics of the wall 202 from the visual monitoring system 128. The controller 134 is communicably coupled to the computing device 132 and is configured to independently control operation of respective ones of the primary motor 108, the secondary motor 126, the robotic mechanism 130, and the spray nozzle 138 in response to the sensed structural characteristics and profile of the wall 202.

In an additional embodiment as shown in FIG. 1, the system 100 also includes multiple linear actuators 140. Each of the linear actuators 140 is slidably engaged with the carrier 110. The system 100 also includes a suction cup 142 located at a free end 144 of each linear actuator 140 and disposed in an opposing relation to the wall 202 of the building 200. The suction cups 142 are configured to selectively adhere with the wall 202 of the building 200 for positioning the carrier 110.

In an embodiment, at least one of the sensed structural characteristics of the wall 202 includes a distance between each suction cup 142 and the wall 202. As shown in FIG. 2, the system 100 further includes ultrasonic sensors 146, disposed on the carrier on two sides, associated with each of the linear actuators 140 shown in FIG. 1. Each of the ultrasonic sensors 146 is configured to output a distance of the associated suction cup 142 relative to the wall 202, to the computing device 132 which in turn provides such outputs to the controller 134. Accordingly, the controller 134 is configured to selectively and independently actuate movement of each of the plurality of linear actuators 140 until respective ones of the suction cups 142 adhere with the wall 202 of the building 200.

In the case where the system 100 is adapted for spray painting, in an embodiment, a paint container 148 is disposed within the carrier 110. Further, as shown in FIG. 2, the system 100 includes a sensor 150 that is disposed in communication with the paint container 148 and the computing device 132. The sensor 150 is configured to output a level of paint remnant in the paint container 148 to the computing device 132.

In the case where the system 100 is adapted for spray cleaning through high speed water jet, the spray nozzle may be connected directly to a water source through water hose. A person skilled in the art would appreciate that the system may require a stronger pump and/or nozzle may be required for cleaning purposes. The carrier can also include a container for loading liquid detergent to aid in the cleaning process.

Additionally or optionally, as shown in FIG. 1, the system 100 further includes a hood 152 be disposed around the spray nozzle 138 as shown in the illustrated embodiment of FIG. 1. The hood 152 is configured to contain sprayed liquid that escapes from being sprayed onto the wall 202.

In a further embodiment, the hood can be any overhead covering means disposed at on the front end of the spraying tip for assisting in isolate overspray and fumes of the sprayed liquid. It is well understood to a skilled person that there can be many forms of geometry applicable to the hood. In yet a further embodiment, the hood can be adapted with barn doors.

In another embodiment, the computing device 132 may be remotely controllable with the help of a remote controller 158 shown in FIG. 2. It is envisioned that with use of the remote controller 158, any function pertaining to individual components of the system 100 can be controlled wirelessly by a remotely located operator via the remote controller 158. Therefore, it may be noted that although the system 100 of the present disclosure is configured to operate autonomously with the help of data from the ultrasonic sensors 146, the paint level sensor 150, and the visual monitoring camera, embodiments of the present disclosure also allow an operator of the system 100 to remotely override any operations and provide alternative commands to the computing device 132 with the help of the remote controller 158 so that the computing device 132 may appropriately control one or more components of the system 100 in accordance with the alternative commands provided by the operator.

Figure 3:
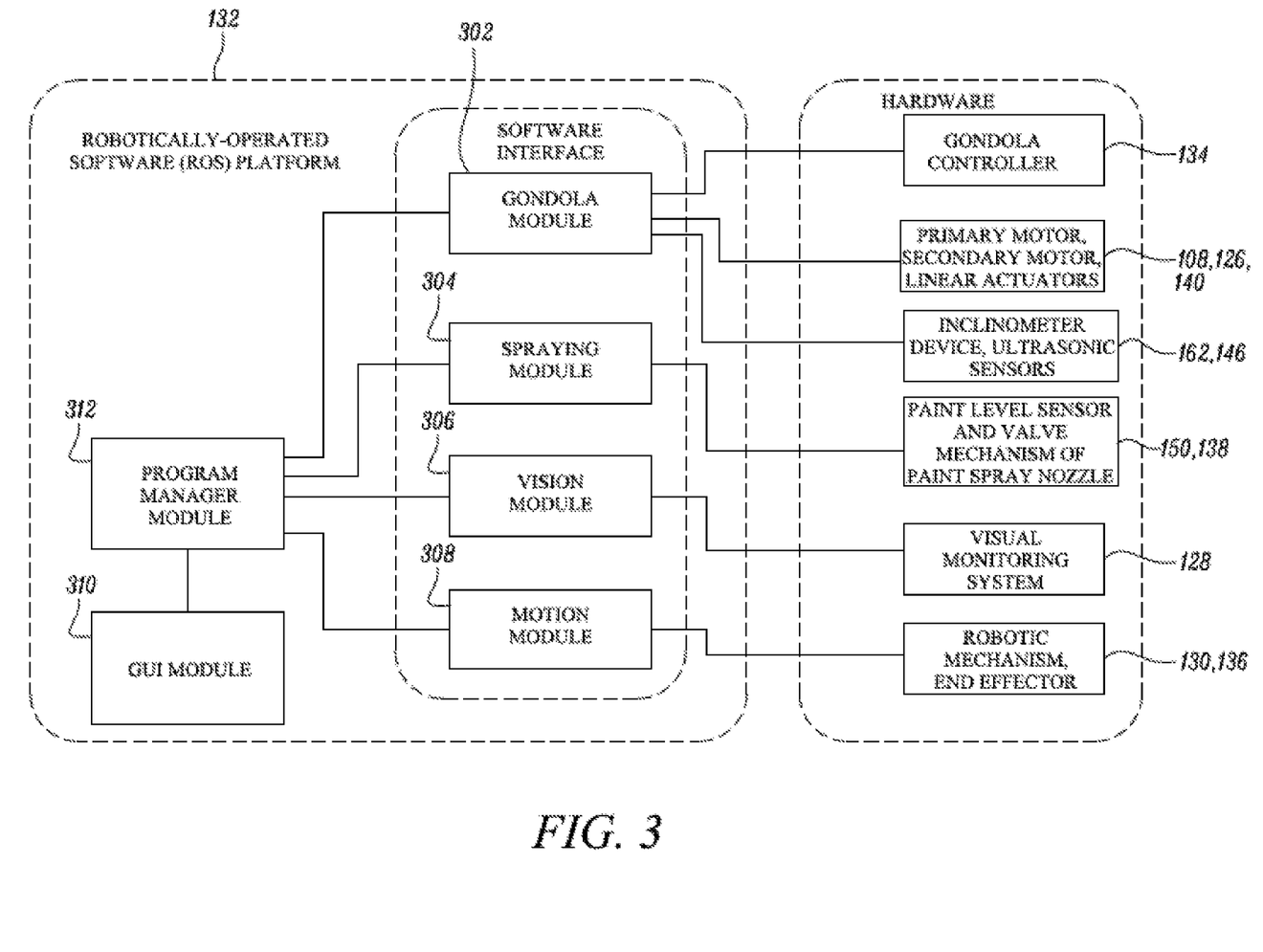
FIG. 3 is a schematic representation of various modules of a computing device associated with the system of FIG. 1, in accordance with an embodiment of the present disclosure.

Referring to FIG. 3 and as disclosed earlier herein, the computing device 132 is communicably coupled to each of the controller 134, the primary motor 108, the secondary motor 126, the inclinometer device 162, the visual monitoring system 128, the ultrasonic sensor 146, each of the linear actuators 140, a valve mechanism 154 shown in FIG. 1 as being associated with the spray nozzle 138, and the robotic mechanism 130.

Moreover, as shown in FIG. 3, the computing device 132 is developed on a robotically-operated software (ROS) platform that is configured to include a carrier positioning module 302, a spraying module 304, a vision module 306, a motion module 308, and a graphical user interface (GUI) module 310. Further, the computing device 132 on which the ROS platform resides would also be configured to include a program manager module 312 that is disposed in communication with each of the carrier positioning module 302, the spraying module 304, the vision module 306, the motion module 308, and the GUI module 310.

As such, it may be understood that the carrier positioning module 302 may be disposed in communication with the controller 134, the primary motor 108, the secondary motor 126, and each of the linear actuators 140. The carrier positioning module 302 may also be disposed in communication with one or more sensors disclosed herein, for example, the inclinometer device 162, the ultrasonic sensors 146, and the like, that are associated with operation of one or more of the primary motor 108, the secondary motor 126, and each of the linear actuators 140. The carrier positioning module 302 therefore, may be configured to receive data from such sensors to help the program manager module 312 in accomplishing the positioning of the carrier 110 appropriately with respect to the wall 202 of the building 200.

Further in the case of spray painting, the spraying module 304 may be disposed in communication with the liquid level sensor 150 and the valve mechanism 154 of the spray nozzle 138. The spraying module 304 may receive data from the liquid level sensor 150 transmit such data and/or feedback to the program manager module 312 for determining the level of paint remnant in the container 148 and for operating the valve mechanism 154 of the spray nozzle 138 to spray on the wall 202 of the building 200.

Furthermore, the vision module 306 would be disposed in communication with the visual monitoring system 128. The vision module 306 can receive data including the sensed structural characteristics of the wall 202 from the visual monitoring system 128 and provide the same to the program manager module 312. This data could help the program manager module 312 to independently control a movement of each of the linear actuators 140 and adhere the suction cups 142 on the wall 202 of the building 200 for stabilizing a position of the carrier 110.

Still further, the motion module 308 may be disposed in communication with the robotic mechanism 130, and particularly with the end effector 136 of the robotic mechanism 130. The motion module 308 may receive feedback from the robotic mechanism 130 and send such feedback to the program manager module 312 so that the program manager module 312 can plan a trajectory for movement of the end effector 136 of the robotic mechanism 130 so that spraying can be commenced on the wall 202 of the building 200 upon stabilizing the position of the carrier 110.

It is to be noted that the modules 302-312 explained in the foregoing disclosure is non-limiting of this disclosure. Rather, other types of modules may be, additionally or optionally, implemented in addition to or in lieu of the positioning module 302, the vision module 306, the spraying module 304, the motion module 308, and the GUI module 310 to co-operate with the program manager module 312 without deviating from the spirit of the present disclosure as will be evident from the explanation pertaining to the working of the system 100 which will be made in detail hereinafter.

Figure 4:
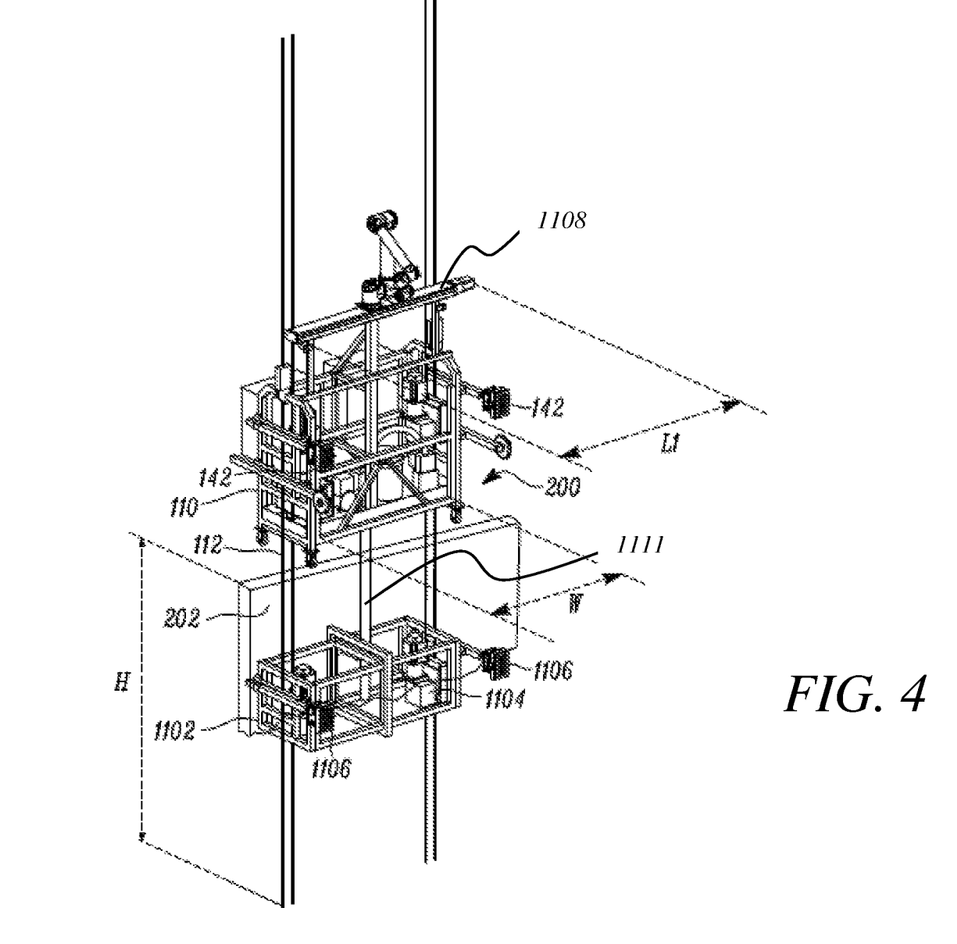
FIG. 4 is a perspective view of the system mounted on a gondola carrier according to another embodiment of the present invention

In an alternative embodiment to the system 100 depicted in FIG. 1, the system 100 may, as shown in FIG. 4, additionally, or optionally, include a stabilizer platform 1102 that may be disposed below the carrier 110 and moveably connecting to the carrier 110 through a connecting bar 1111. The stabilizer platform 164 may include therein, a drive system that is moveably engaged to the connecting bar 1111, and at least one secondary suction mechanism 1106 that is similar to or different from the suction cup 142 of the carrier 110. The drive system 1104 may be commanded to operatively position the stabilizer platform 1102 relative to the carrier 110. Additionally, the secondary suction mechanism 1106 could also be commanded for adhering with the wall 202 of the building 200. When the secondary suction mechanism 1106 adheres to the wall 202 of the building 200, the secondary suction mechanism 1106 provides added resistance to the carrier 110 from swinging into or away from the wall 202 of the building 200.

During operation, it is envisioned that if the carrier 110 is to be moved e.g., downward along the height H of the building 200, then the secondary suction mechanism 1106 is first released from adherence with the wall 202 and thereafter, the drive system 1104 is commanded to operably move the stabilizer platform 1102 downward along the height H of the building 200. Once the stabilizer platform 1102 is moved to a predetermined or anticipated position in relation to a position at which the carrier 110 needs to be subsequently moved into, the secondary suction mechanism 1106 would be commanded to adhere with the wall 202 of the building 200 before commanding the secondary motor 126 to move the carrier 110 into its subsequent position. Therefore, in this embodiment, it may be noted that at any given instant of time, either the secondary suction mechanism 1106 associated with the stabilizer platform 1102 or the suction cups 142 from the carrier 110 are in adherence with the wall 202 of the building 200. As the carrier 110 and the stabilizer platform 1102 connected through the connecting bar 1111 and are also disposed on the same set of cables 112, forces, for example, undesired forces associated with wind, that could otherwise displace the carrier 110 are mitigated by the adherence of the secondary suction mechanism 1106 and/or the suction cups 142 and in this way, the gondola carrier 110 could be resisted from swinging into or away from the wall 202 of the building 200 while it is "crawling" along the vertical wall 202.

Also, as shown in the illustrated alternative embodiment of the system 100 in FIG. 4, the system 100 may further include a linear track 1108 located above the carrier 110 and disposed horizontally with respect to the height H of the building 200. A length L1 of the linear track 1108 may be selected such that the linear track 1108 would be configured to extend at least up to a width W of the carrier 110. The robotic mechanism 130 may be slidably disposed on this linear track 1108, and in operation, the robotic mechanism 130 may be commanded to traverse the length L1 of the linear track 1108 so as to be axially displaceable in position. The linear track 1108 can offer a greater range of movement to the robotic mechanism 130 as it allows the robotic mechanism 130 to be positioned at any desired point along the length L1 of the linear track 1108. This way, when spraying operation is in process, a reach of the end effector 136 may be enhanced to cover a greater surface area of the wall 202 in a single pass of the carrier 110. Also, with greater reach of the end effector 136, a number of times for which the frame 106 would otherwise need to be moved along the rail 102 can be potentially minimized to reduce an overall cycle time associated with re-positioning the carrier 110 for spraying the wall 202 of the building 200.

Figure 5:
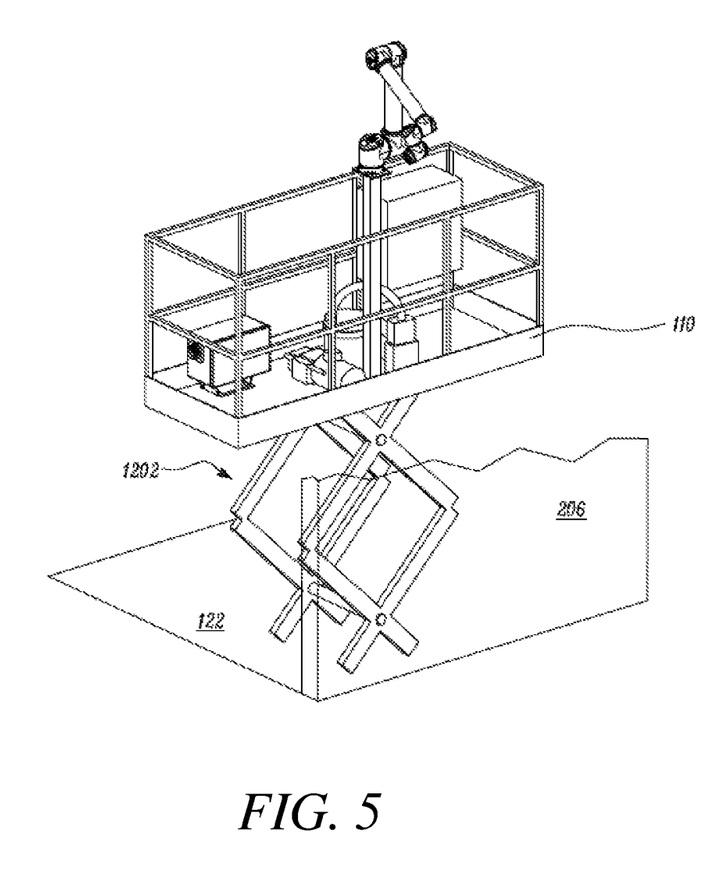
FIG. 5 is a perspective view of the system mounted on a scissor lift according to one embodiment of the present invention.
Figure 6:
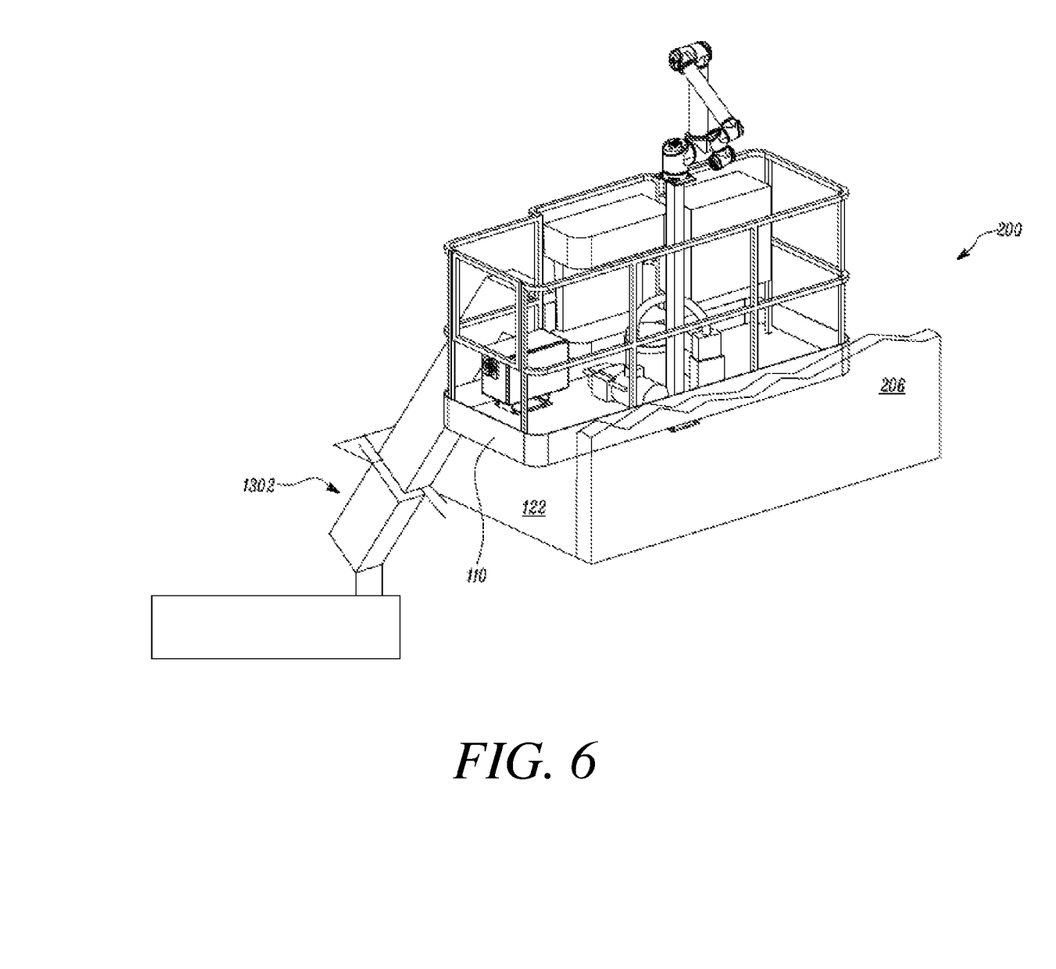
FIG. 6 is a perspective view of the system mounted on a boom lift according to another embodiment of the present invention.

Referring to other alternative embodiments depicted in FIGS. 5 and 6, the carrier 110 may be a scissor lift arrangement 1202 as shown in FIG. 5 or a boom lift arrangement 1302 as shown in FIG. 6 respectively. The scissor or boom lift arrangements 1202/1302 can be used in lieu of the cables 112 and the secondary motor arrangement 126 to operably vary a height to which the carrier 110 is moved in relation to the ground surface 122. In fact, the scissor lift arrangement 1202 and the boom lift arrangement 1302 may allow the gondola carrier 110 to not only be used in accomplishing a spraying of the wall 202 of the building 200 (shown in FIG. 1) but also in spraying an interior wall 206 of the building 200.

It is understood to a skilled person that the system 100 in accordance with the present invention is adapted for mounting on any aerial device, such aerial work platform, elevating work platform or the like.

Figure 7:
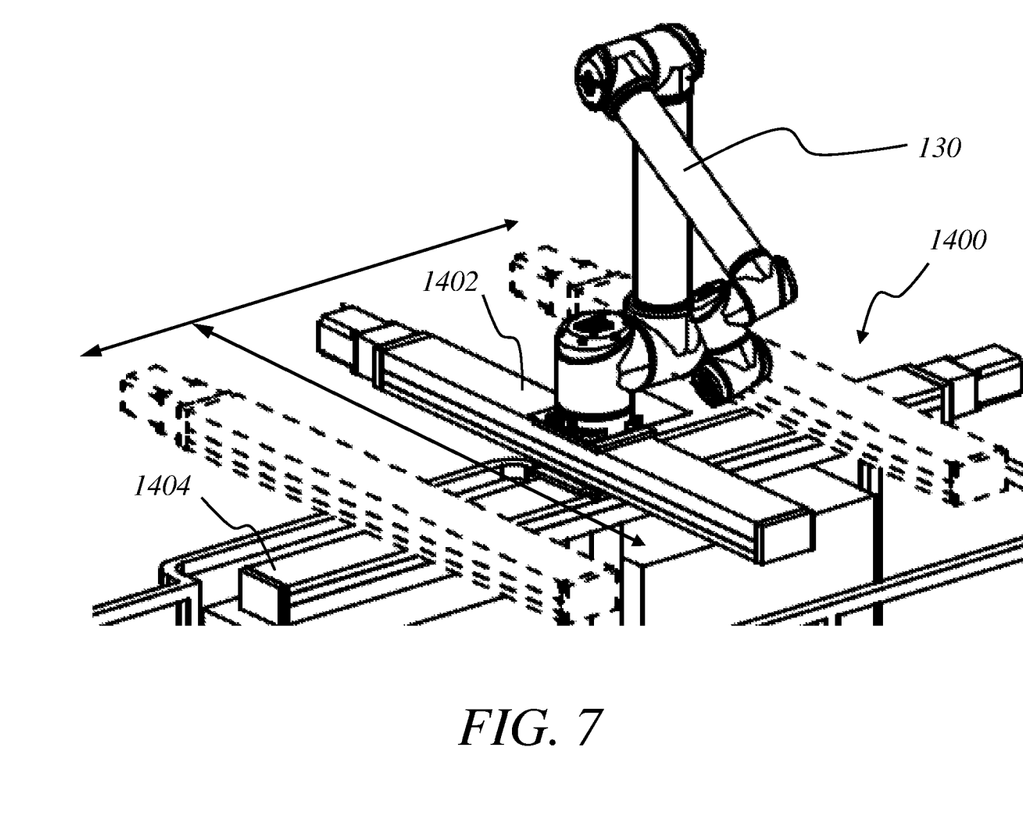
FIG. 7 is a perspective view of a two track system adapted for slidable mounting a robotic mechanism in accordance with an embodiment of the present invention.

In yet a further embodiment of the present invention as shown in FIG. 7, the robotic mechanism 130 is mounted on a two-ways track system 1400 allowing the robotic mechanism 130 be moving in at two axes directions, i.e. both longitudinal and lateral directions. As shown, the two-ways tack system 1400 comprises a lateral track 1402 slidably attached on a longitudinal track 1404. The robotic mechanism 130 is slidably mounted on the lateral track 1402 allowing the robotic mechanism 130 be moving along the length of the track, while similarly, the lateral track 1402 that mounted on the longitudinal track 1404 allows the robotic mechanism 130 movable along the length of the longitudinal track 1404. Accordingly, the two-ways track system 1400 extends the movability of the robotic mechanism 130 on the vehicle (including gondola) on which it is mounted.

In another embodiment, the two-ways track system 1400 can be adapted as a H shape track having a longitudinal track disposed between two lateral tracks. The two way track system 1400 can be mounted on any vehicles, such as gondola, boom lift, scissor lift or the like.

With the various configurations offered by the embodiments of the present invention, it is well understood to a skilled person that spray system can be used for external wall as well as internal wall when it is mounted on a suitable vehicle. By replacing the nozzle head with inspection means, the present system can also be used to automate wall inspections.

Various embodiments disclosed herein are to be taken in the illustrative and explanatory sense, and should in no way be construed as limiting of the present disclosure. All directional references (e.g., top, bottom, above, below, lower) are only used for identification purposes to aid the reader's understanding of the present disclosure, and may not create limitations, particularly as to the position, orientation, or use of the system and/or method disclosed herein. Moreover, all joinder references (e.g., attached, affixed, joined, adhere, associated, connected, and the like) are only used to aid the reader's understanding of the present disclosure, and may not create limitations, particularly as to the position, orientation, or use of the system and/or method disclosed herein. Therefore, joinder references, if any, are to be construed broadly. Moreover, such joinder references do not necessarily infer that two elements are directly connected to each other.

Additionally, all numerical terms, such as, but not limited to, "primary", "secondary", "first", "second", "third" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

Embodiments of the present disclosure have applicability for use and implementation in painting and cleaning walls 202 of a building 200. As the system 100 of the present disclosure is provided with the robotic mechanism 130, the robotic mechanism 130 can be advantageously automated with capabilities to perform the required operations on the wall 202 of the building 200, with minimal or no human interactions. Moreover, with use of the embodiments disclosed herein, it would be easy and quick to shuttle the carrier 110 of the present disclosure in comparison to traditional designs.

Hence, use of the system 100 disclosed herein for spray painting or cleaning the walls of a building may advantageously save time, costs, labours and effort that were typically incurred with manual painting and cleaning of the walls by personnel disposed within a traditionally designed carrier or vehicles.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An automated system for spraying a wall of a building, the automated system comprising:
    a carrier comprises a gondola mounted on the building, the gondola having a plurality of suction cups diposed in an opposing relation to the wall, wherein the suction cups are configured to operationally adhere with the wall of the building for positioning the carrier;
    a robotic mechanism mounted on the carrier, the robotic mechanism further having an end effector adapted to support a spray nozzle thereon;
    a visual monitoring system configured to scan structural characteristics and profiles of the wall;
    a computing device disposed in communication with the visual monitoring system and the robotic mechanism, wherein the computing device is configured to receive the scanned structural characteristics and profile of the wall from the visual monitoring system; and
    a controller communicably coupled to the computing device, the controller configured to independently control operation of respective ones of the robotic mechanism, and the spray nozzle according to the scanned structural characteristics and profiles of the wall,
    wherein the automated system further comprising:
    a stabilizer platform disposed below the carrier, and moveably connecting to the carrier through a connecting bar, and a drive system adapted to operatively position the stabilizer platform relative to the carrier along the connecting bar; and
    a secondary suction mechanism installed on the stabilizer platform, wherein the secondary suction mechanism is separately controlled to adheres to the wall of the building,
        wherein operationally when the stabilizer platform is moving in relation to the carrier, at least either one of the suction cups or the secondary suction mechanism is adhered to the wall of the building.

2. The system of claim 1, further comprising a linear track located on the carrier and disposed horizontally with respect to the heigh of the building, wherein the robotic mechanism is slidably mounted on the linear track.

3. The system of claim 1, further comprising a two ways tracks disposed on the carrier, wherein the robotic mechanism is slidably mounted thereon, the two ways tracks comprises at least two axes movements allowing the robotic mechanism to slide over the two axes movements.

4. The system of claim 1, wherein the suction cups located at a free end of each linear actuator.

* * * * *